United States Patent [19]

Johnson

[11] 3,904,489

[45] Sept. 9, 1975

[54] APPARATUS AND METHOD FOR CONTINUOUS SELECTIVE ELECTROPLATING

[75] Inventor: Frank J. Johnson, Santa Clara, Calif.

[73] Assignee: Auric Corporation, Newark, N.J.

[22] Filed: July 13, 1973

[21] Appl. No.: 379,113

[52] U.S. Cl. ................ 204/15; 204/202; 204/224 R

[51] Int. Cl.$^2$ ........................................ C07C 51/44

[58] Field of Search .......... 204/15, 224 R, 206–211, 204/198, 202

[56] References Cited

UNITED STATES PATENTS

| | | | |
|---|---|---|---|
| 936,472 | 10/1909 | Pfanhauser | 204/206 |
| 2,591,042 | 4/1952 | Berman et al. | 204/202 |
| 3,123,543 | 3/1964 | Chapman, Jr. et al. | 204/28 |

FOREIGN PATENTS OR APPLICATIONS

| | | | |
|---|---|---|---|
| 760,016 | 10/1956 | United Kingdom | 204/224 R |

*Primary Examiner*—T. M. Tufariello
*Attorney, Agent, or Firm*—Stefan J. Klauber, Esq.

[57] ABSTRACT

Apparatus and method for continuous electroplating of selected portions of discrete electronic components. A movable plating belt adapted for carrying electroplating solution on the surface thereof, is continuously moved through an electroplating station, with the electroplating solution being applied to the belt upstream of the plating station. The components to be selectively plated are arrayed into a line and conveyed across the surface of the moving belt with the portions selected to be plated in contact with the electroplating solution. The direction of conveyance is skewed with respect to the line along which the said belt moves, whereby the trace of each conveyed component on the belt, continuously overlies fresh electroplating solution. A D.C. electrical potential is applied between the components and the backside of the plating belt, to enable the electroplating action.

28 Claims, 5 Drawing Figures

APPARATUS AND METHOD FOR CONTINUOUS SELECTIVE ELECTROPLATING

BACKGROUND OF INVENTION

This invention relates generally to electroplating apparatus and methodology, and more specifically relates to the electroplating with gold of electronic components or the like.

Gold, within recent years, has become a very important part of the electronics industry. Among those properties recommending its use therein, are its relative unalterability, high solderability, and low contact resistance. In the semi-conductor field, gold has furthermore found favor because of its ability to readily form an eutectic alloy with silicon and germanium. In the latter connection it may be noted that most headers or packages for diodes, transistors, and integrated circuits, are gold plated as a preparation for the mounting or attaching of semiconductor devices. Such components are exemplified by the well-known line of TO-5 and TO-8 multi-lead headers. Such headers consist of an eyelet of Kovar metal to which several insulated Kovar leads are attached, and sealed in glass.

In accordance with known principles in the art, headers of the foregoing type have, in the past, been plated (among other methods) by so-called barrel plating techniques — that is, by subjecting such articles to electroplating while a plurality of articles tumble in a barrel. These barrel techniques, however, have many important drawbacks, numerous of which are recognized in the art. For example, where headers or the like are thus plated, it is found that many leads do not make electrical contact with the remainder of the load. Where such conditions obtain during the plating cycle, the portion of the lead closest to the anode becomes cathodic. Such leads become bipolar and at the anodic portions of the leads problems can arise in that the gold may redissolve anodically, and as well base metal can be attacked to expose bare spots. Where the tumbling action is markedly inadequate these problems can become quite severe. In the past these problems have partially been overcome by incorporating mechanical means for improving electrical conductivity through the load. Such means have taken the form of metal particles, or metal shot. Unfortunately during plating operation the shot itself becomes gold plated, resulting in loss of gold, and attendance increase in the cost of plating the desired objects, that is, the headers, etc.

Within recent years, particularly because of the soaring price of gold, it has furthermore been increasingly appreciated that barrel plating techniques (and as well, common rack plating techniques) are exceedingly wasteful of the gold itself. If one considers, for example, the most common use of barrel plating in the electronic industry, i.e., the plating of the aforementioned headers, it will be appreciated that basically one is only interested in providing a plating at the die receiving face thereof, and at the contact connections for the header leads which are present at the said face. Barrel plating techniques, however, are such that the entire header is plated with gold, including all electrically conductive, accessible portions thereof. Furthermore, since barrel plating is based upon the development of multiple electrical contacts among the tumbling components, it is basically a statistical process. This is to say, that different components in a tumbled load, may be subjected to markedly different plating times. In order to achieve a desired mean plating thickness, it is therefore necessary to grossly overplate the batch of components being plated during a given cycle. In other words, in order to assure that all of the individual components in a batch receive adequate plating, it is frequently necessary to overplate many of the components by as much as 10 to 20%. This is obviously a further waste of the precious gold material.

Finally, it may be noted that both in the instance of most forms of rack plating, and particularly in the case of barrel plating, the operations are indeed of the batch type. This is to say that they are not regarded as continuous, in the sense that a production line or the like of the components can be formed and continuously passed through the plating operations to emerge as finished pieces.

In accordance with the foregoing, it may be regarded as an object of the present invention, to provide method and apparatus enabling on a mass production basis, the electroplating of selected portions of electronic components or the like, thereby eliminating the waste of plating metals previously occurring where the said components were subjected to gross plating thereof.

It is a further object of the present invention, to provide a method enabling selective electroplating of electronic components or the like with gold or similar precious metals, which method and apparatus enables such operations on a continuous basis, which result in platings of excellent quality and carefully controlled thicknesses, and wherein the uniformity of plating thickness and of quality from piece to treated piece is correspondingly high.

SUMMARY OF INVENTION

Now in accordance with the present invention, the foregoing objects, and others as will become apparent in the course of the ensuing specification, are achieved in apparatus and method which enable continuous electroplating of selected portions of discrete electronic components or the like. In accordance with the invention a plating belt adapted for carrying electroplating solution on the surface thereof, is continuously moved through an electroplating station. Electroplating solution is applied to the belt at a point in the progression thereof, which is upstream of the electroplating station, as for example, by passing the belt (which may be in the form of a loop) through a reservoir for the solution. The discrete components to be selectively electroplated are arrayed into a line, and are conveyed across the surface of the moving plating belt, with the portions of the components to be plated in contact with electroplating solution on the belt. The direction of movement of the components is generally counter to the movement of the plating belt, and is more specifically at a skewed direction with respect to the direction of movement of the said belt. The angle of skewing in relationship to the speed of progression of the plating belt and of the components, is such that the trace of each component upon the plating belt continuously overlies fresh electroplating solution; which is to say that the various components are continuously wiped by fresh electroplating solution. A D.C. electrical potential appropriate to enable the desired electroplating, is applied between the component portions to be plated and the backside of the plating belt. This, for example, may be accomplished by means of an anode electrode which backs the said belt, and by using a cathodically biased conductive conveying belt for advancing the said components, with additional cathodic contacting means being provided for assuring that the insulated leads forming part of the said components are similarly rendered cathodic with respect to the said anode.

BRIEF DESCRIPTION OF DRAWINGS

The invention is diagrammatically illustrated, by way of example, in the drawings appended hereto, in which.

DESCRIPTION OF PREFERRED EMBODIMENT

Figure 1:
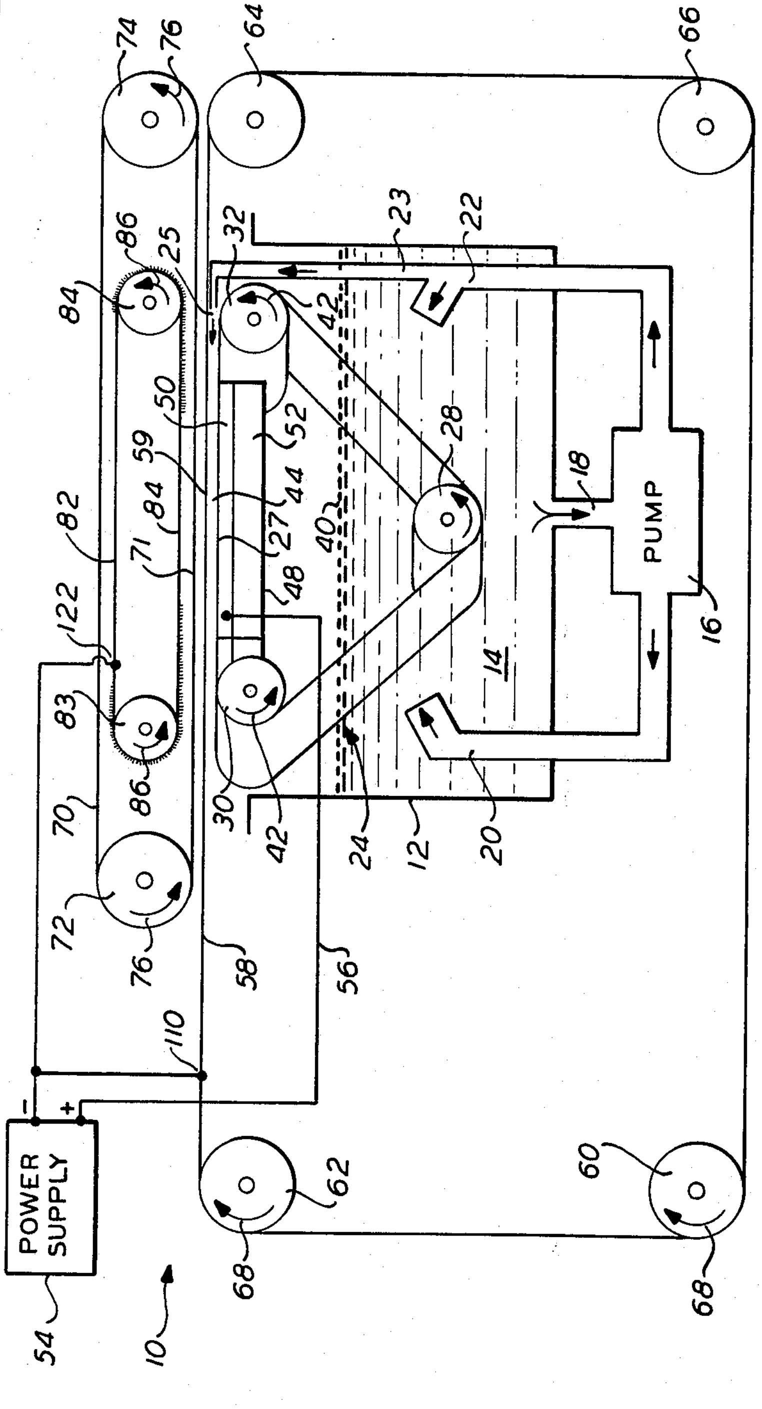
FIG. 1 is a schematic, elevational view of electroplating apparatus in accordance with the present invention.

In FIG. 1 herein an elevational, highly schematic view appears of electroplating apparatus 10 in accordance with the present invention. As will become increasingly apparent in the course of the present specification, apparatus 10 is particularly adapted for use in electroplating of electronic components, such as the well-known TO-5 and TO-8 multi-lead headers which have heretofore been mentioned. The use of the invention will accordingly be particularly described with reference to such application, but it will become evident that the invention is utilizable (with suitable structural modifications in the conveying belts, etc.) with various other electronic components, as well as with other discrete objects as may require electroplating at selected portions thereof. Similarly, and as will also become apparent, while the invention is particularly valuable and intended for use in the plating of precious metals, particularly gold, there is no necessity whatsoever for so limiting its use, and accordingly electroplating solutions other than gold, as are known in the art, may be utilized with the invention.

Electroplating apparatus 10 is seen to include a reservoir 12 for electroplating solution 14 carried therein. Reservoir 12, which is a simple tank of suitable materials as are compatible with and resistant to solution 14, is provided with pump means 16, having an inlet 18 from reservoir 12, and outlets 20 and 22 for returning the solution to the reservoir. Pump 16 serves primarily to provide continuous or semi-continuous agitation of the electroplating solution, and may be provided with filters, etc., for removing sediment or the like from the solution passing therethrough. Since the present apparatus 10, as has been previously indicated, is of particular use in gold electroplating applications, the solution 14 (although not per se comprising part of the present invention), commonly comprises an aqueous solution of an alkali-gold-cyanide, together with suitable buffering compounds, conductivity salts, and other agents as may be known in this art to be useful in promoting the production of high quality gold platings.

In accordance with the invention, there is positioned for cooperation with reservoir 12 an electroplating solution applying means, generally designated at 24. Means 24 is based upon a plating belt 26, which is formed as a continuous loop, and passes about a series of rollers 28, 30 and 32, one or more of which may be driven by motor means (not shown in the present drawing). Plating belt 26, as may be readily seen in the enlarged view of FIG. 4, typically comprises a fabric backer 34 of Dacron or the like, to which is secured a fibrous nap 36, as for example, of Dynel. A structure of this type is basically similar to the applicator material utilized in common paint rollers, and similar means utilized in the past for applying decorative coatings to surfaces by contact therewith. In the present instance a primary consideration is, of course, that the specific fabric materials utilized, be compatible with the electroplating solution i.e., not subject to attack thereby.

As is seen in FIG. 1, the lower portions of means 24 are beneath the surface 40 of plating solution 14, in consequence of which as the belt moves in the direction indicated by the arrows 42, a continuous supply of electroplating solution is brought to the electroplating station — which is generally designated at 44. The supply of electroplating solution on belt 26 is augmented by means of the duct 23, which discharges a portion of the pumped liquid through a nozzle 25, so that the liquid impinges on the belt as the latter approaches plating station 44. Discharge of electroplating solution in this manner, not only assures an abundant supply of same at the plating station, but moreover introduces such liquid at the relatively high temperatures of the reservoir 12 (which may be thus maintained by heaters or the like). These elevated temperatures are of considerable significance in achieving fully acceptable platings at station 44.

Figure 2:
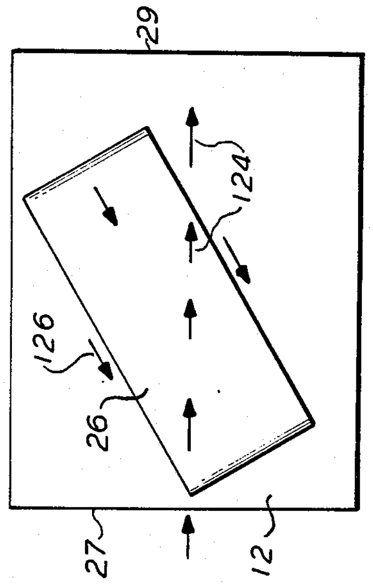
FIG. 2 is a schematic plan view, looking downward toward the electroplating solution reservoir, and illustrating the relationship between the respective directions of movement of the plating belt, and of the components being plated by the apparatus.

For reason as will shortly be apparent, solution applicator means 24 is so mounted with respect to reservoir 12, that the direction of movement of belt 26 is not parallel to the plane of the drawing, but rather, as is apparent from the plan view of FIG. 2 herein, is skewed with respect to the said plane. Assuming that reservoir 12 thus has the rectangular geometry therein shown, it is apparent that the lengthwise orientation of belt 26, and its direction 25 of movement, are skewed at an acute angle of the order of 60° with respect to the walls 27, 29 of reservoir 12, respectively depicted at the left and right sides of that structure.

In order to provide the anodic potential required at electroplating station 44, it is further seen that belt 26 as it progresses through the said station, passes in overlying relationship to an anode backing electrode 48, which may consist of a support plate 50 and an anode plate 52. The required positive potential for electrode 48 may be provided by means of a conventional D.C. power supply 54 which connects to plate 52 by means of a lead 56. Lead 56 may also connect through support plate 50 if the latter is suitably conductive and electrically continuous with plate 52.

Continuing to refer to FIG. 1, it is next seen that a lower conveying belt means 58, preferably again in the form of a continuous loop, passes completely about the reservoir 12, and is guided by a series of rollers 60, 62, 64 and 66, one or more of which may be driven by conventional motor means (not shown in the drawing). These rollers rotate in the direction indicated by arrows 68. The configuration of belt means 58 is seen to be such that a portion 59 of the belt means passes essentially in a flat plane through the electroplating station 44, at a position somewhat above a corresponding flat portion 27 of the solution-carrying plating belt 26. Spaced slightly above the path of movement of belt means 58 at plating station 44, is a gripper belt means 70, which passes about the rollers 72 and 74, one or both of which may be driven by conventional motor means not shown in the drawing. These rollers progress in the direction indicated by arrows 76. Gripper belt means 70 includes a flat portion 71 at the region where means 70 passes through station 44. Finally, there is seen to be mounted for movement within belt means 70, a cathodic lead contact belt 82. This latter belt is also mounted upon a pair of guide rollers 83 and 84, which rotate in the direction indicated by arrows 86. One or more of rollers 83 and 84 are driven by motor means, not explicitly shown in the present drawing. As is the case with belt means 26 and 70, belt 82 includes a portion 84 which passes through plating station 44, substantially in a plane. The motive means driving the aforementioned belt structures 70 and 82 are so geared or otherwise regulated, that the linear rate of progression of portions 71 and 84 are substantially equal at the plating station 44.

Figure 3:
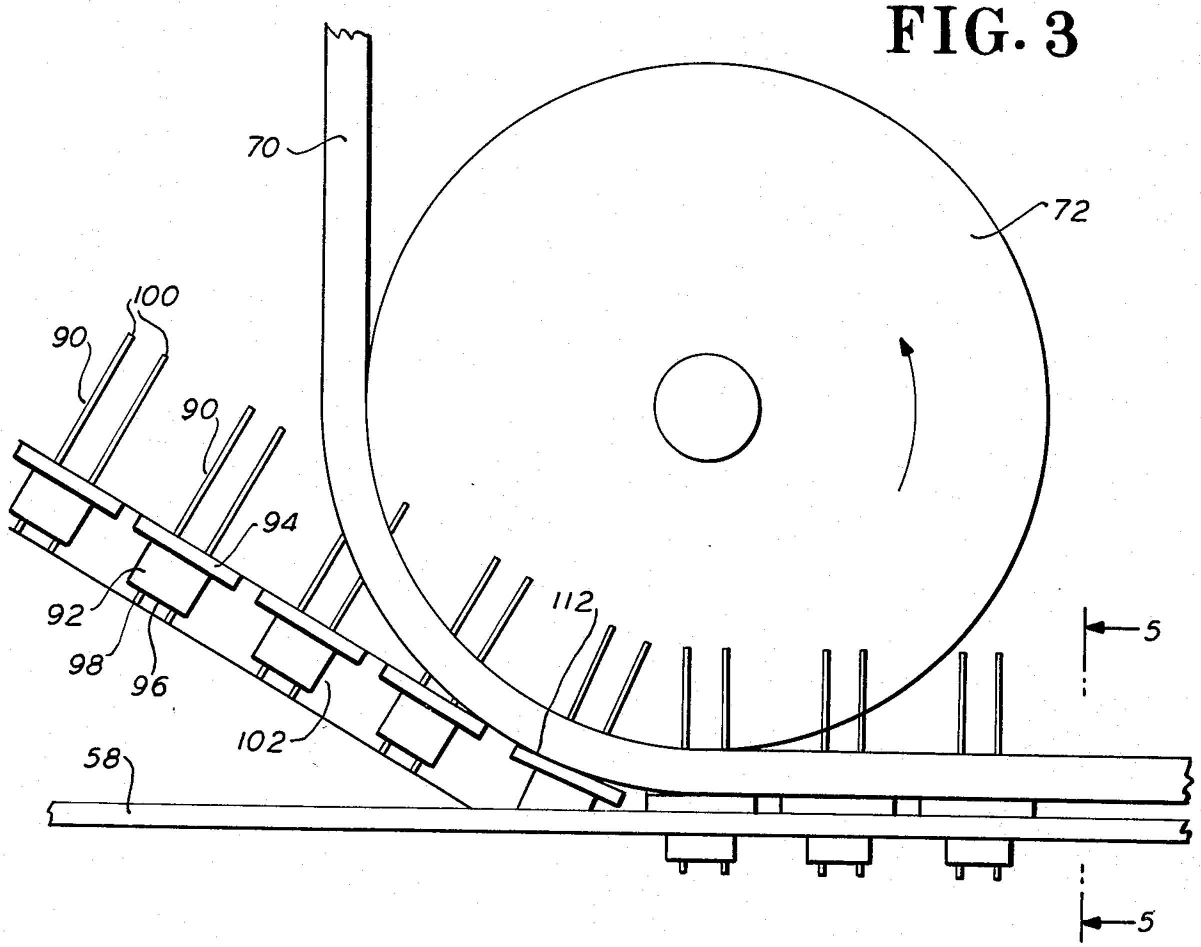
FIG. 3 is an enlarged view of a portion of the FIG. 1 apparatus, and illustrates the manner in which components to be plated by the present apparatus are conveyed through the electroplating station.

Referring now to the enlarged schematic view of FIG. 3, the basic technique of conveyance for a series of components 90, is set forth. For purposes of concretely illustrating the nature of the present invention, the component 90 is deemed to constitute a multi-lead header of the type previously discussed herein. These headers are not shown in any great detail, in view of the fact that their construction is conventional and well-known. Such construction is seen, however, to include a body portion 92 provided with an enlarged lip 94. The bottom of the header terminates at a die-receiving face 96. As is well known in this art, the face is surrounded by a plurality of terminal connections 98. In order to illustrate the invention more clearly, connections 98 have been exaggerated in scale — as have certain other attributes of the header, including the diameter of lip 94 in comparison to that of body 92. In point of fact connections 98 consist of a conductive terminal which is separated from the rest of body 92 by an insulating collar or the like. This type of structure, for example, may be seen at page 5 of the standard handbook "RCA Linear Integrated Circuits"(1970) available from the Solid State Division of RCA, Somerville, N.J. 08876. The several connections 98 are in electrical continuity with a corresponding number of leads, two of which are shown at 100. These leads are again exaggerated in scale for purposes of simplicity. In practice, and as is known in the art, an integrated circuit chip or the like, is intended to ultimately be positioned at die-receiving face 96, with connections being made to the secured chip via the several connectors 98; thereafter the leads 100 enable (in the finished package) macroscopic connections to be made to the packaged chip.

The plurality of components 90 are fed into the present apparatus 10 in line form. The components may be arrayed by simple hand-feeding operations, or by simple automatic devices. For purposes of illustration a simple inclined track 102 is shown enabling a continuous in line feed of the said components. As the components descend to the bottom of track 102 it is seen that they impinge upon and are supported by the belt means 58 discussed in connection with FIG. 1. Belt means 58 comprises an electrically conductive material, preferably a stainless steel. As is best seen in the detail cross-section of FIG. 5, taken along the line 5—5 of FIG. 3, belt means 58 is so constituted that an opening 104 is defined therein, which is appropriate to support the lip portion 94 of component 90 thereon. Preferably belt means 58 comprises two distinct stainless steel belts 106 and 108, which move parallel to one another at a common speed, whereby the spacing between the two belts 106 and 108 defines the said opening 104. By varying the lateral spacing between the two belts 106 and 108, it will be obvious that the opening 104 may be rendered such as to support components of differing sizes. In actual practice, although exaggerated in the present drawing, the lip 94 projects very slightly from the remaining body 92 (in a typical header about 0.010 inch projection), so that the belts 106 and 108, which must be quite thin in order not to interfere with electroplating action, may be quite wide, for example, of the order of three-fourths inch in width, in order to enable sufficient tensile strength at the points of support. This point may be better appreciated by noting in FIG. 3 that once the component 90 is supported on belt means 58 it is desired that the portions to be electroplated — specifically the face 96 and connections 98 — project below the plane of the belt means 58 to enable the said electroplating.

Belt means 58, constituting the two conductive belts 106 and 108 are rendered cathodic by means of wiping electrical contacts 110 connected to the negative side of power supply 54. Such wiping contacts may constitute conventional brush elements as are commonly utilized for these purposes, including without limitation metal brushes, graphite brushes, or the like; and similarly wiping contact plates, or so forth may be used.

Figure 5:
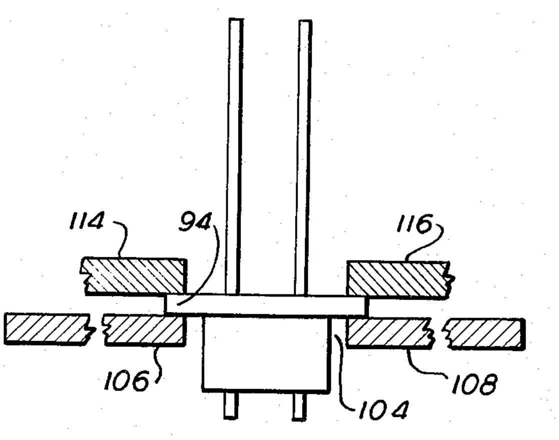
FIG. 5 is a cross-sectional detail view, taken along the direction 5—5 of FIG. 3 herein, and illustrates the manner in which a typical component treated by the apparatus of the invention, is supported during its transport through the electroplating station.

In order to assure stability of the components 90 as they are conveyed through electroplating station 44, the upper or gripper belt means 70 engages an upper face of component 90, so as to sandwich the component in a firm manner as it passes through station 44. This action is best seen in FIG. 3 from whence it is noted that the belt means 70, preferably comprising a natural or artificial rubber such as neoprene, after passing about roller 72, is brought to bear upon the upper face 112 of body 92. Gripper belt means 70 may again comprise a pair of parallel moving laterally spaced belts 114 and 116, as seen in FIG. 5. These belts, like belts 106 and 108 are adjustable laterally with respect to one another (by being moved laterally on their rollers) so as to enable apparatus 10 to process components of differing widths.

Figure 4:
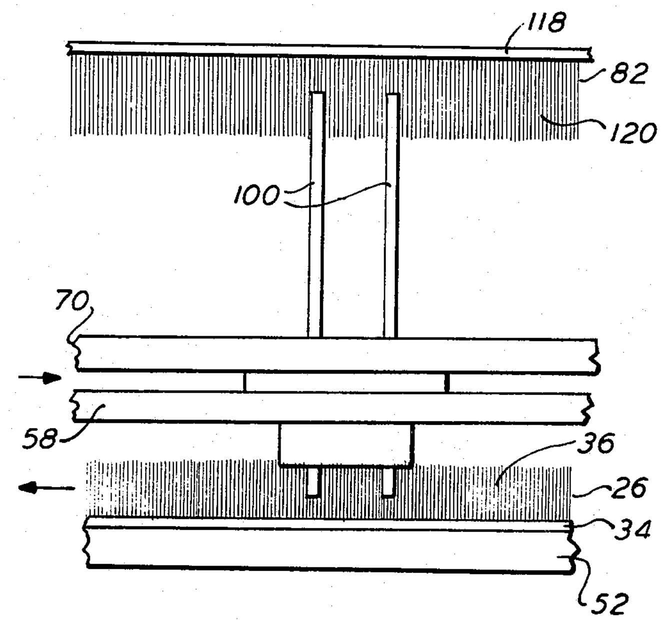
FIG. 4 is an enlarged view of a portion of the electroplating station of the FIG. 1 apparatus, and illustrates the manner in which the required electrical contacts are achieved at the station, and the technique by which electroplating solution is applied.

In FIG. 4, a considerably enlarged view is apparent of a component 90 passing through a typical mid-range point at station 44. In this view the function of the cathodic lead contact belt 82 becomes apparent. As is best seen in that Figure the said belt 82 preferably comprises a substrate 118 the material of which is preferably conductive, although non-conductive material can be utilized depending upon the nature of the flexible lead contact layer 120 secured thereto. The said flexible lead contact layer 120, may suitably comprise steel filaments or the like, or even appropriate grades of steel wool, etc. Similarly, the said layer 120 may suitably comprise a relatively flexible conductive rubber, such as graphite-impregnated neoprene or the like. The function of conductive layer 120 is to assure that a cathodic potential is provided to the terminal connections 98. Since, as has been previously indicated, these connections are actually insulated from the remainder of body 92, the negative electrical potential applied through wiping contact 110 is only useful in rendering face 96 cathodic. By applying, however, a potential to layer 120, as for example, by means of the wiping contact 122 (which is similar in structure to contact 110, and which may engage with layer 120 where the elements of the layer are sufficiently intertwined to create electrical continuity, but which preferably engages the substrate 118, with that latter element being conductive) a potential is enabled to each of the leads 100, which in turn enables the negative potential at connections 98.

Returning now to the schematic depiction of FIG. 2, the full significance of the skewed directional movements between, respectively, the belt 26 and the progressing array of conveyed components 90, may be fully appreciated. Referring to that Figure the path of progression of components 90 is indicated by the trace of arrows 124 — which is the projection of the path of movement of the said components upon belt 26. Firstly, it is noted in that Figure that the general direction of movement 126 of belt 26 is opposed to the dirrction of movement of the components. As is best seen, however, by referring to FIG. 4, the basic scheme pursuant to which the desired portions (namely, face 96 and connections 98) are to be electroplated by the invention, involves passage of the said portions over the surface nap 36 of plating belt 26, whereby the electroplating solution carried by nap 36 contacts those portions of component 90 desired to be plated in the presence of a potential difference established by anode plate 34 and the cathodic potential applied either by belt means 58 or by flexible conductive layer 120. In order, however, for this process to be fully effective, it will be appreciated that each of the successive components forming part of the array, should be brought into constant contact with fresh electroplating solution. Accordingly, by examination of FIG. 2, it will be apparent that effective results will not be achieved were a given component to pass over a portion of belt 26 that had previously been depleted of electroplating solution by a component immediately preceding the one being considered. Accordingly, in order to assure that fresh solution is thus applied, the direction of movement of belt 26 is substantially skewed with respect to the trace of arrows 124. The precise angularity of skewing will, of course, be a function of the velocity of relative movement of the belt 26 and of the conveying belts 58 and 70 which advance the components 90, as well as of the spacing between components; but the several elements will be interrelated so that a condition is achieved, whereby successive components in the advancing array are not brought into contact with areas on the belt 26 previously depleted of solution by other components. As has already been discussed, and as is apparent in FIG. 2, a representative and useful degree of skewing is an angle of the order of from about 150° to 135° between the two directions of advance; but angles of greater than 150° may be used depending upon the factors previously mentioned, and angles to at least 90° or less may be effectively utilized.

While the invention has been particularly illustrated for the simple case where a single aligned array of components is advanced into the apparatus, it will be apparent that multiple, parallel component lines can be treated by substantially similar apparatus and methodology. In these further cases, however, multiple groupings of conveying belts, and as required multiple electrical contacts, are utilized, in order to assure similar results. While, therefore, the present invention has been particularly set forth in terms of specific embodiments thereof, it will be understood in view of the instant disclosure, that numerous variations upon the invention are now enabled to those skilled in the art, which variations yet reside within the scope of the instant teaching. Accordingly, the invention is to be broadly construed, and limited only by the scope and spirit of the claims now appended hereto.

I claim:

1. Apparatus for continuous electroplating of selected portions of discrete electronic components, while minimizing the plating of non-selected portions of said components, comprising:

an electroplating station;

a moveable plating belt adapted for carrying electroplating solution on the surface thereof;

means forng station;

means for applying electroplating solution to said belt at a point in the progression thereof, upstream of said electroplating station;

belt means for conveying said discrete components as an array of mutually spaced elements across the surface of said moving plating belt, with substantially only the portions of said components selected to be plated in sliding contact with said electroplating solution on said belt; the direction of movement of said conveyed array being such in relationship to the movement of said belt that the trace of each said component on said belt continuously overlies fresh electroplating solution; and means for applying a D.C. electrical potential between said component portions to be plated, and the backside of said plating belt, to enable said plating.

2. Apparatus in accordance with claim 1, wherein said plating belt is a continuous loop, whereby said solution applying means continuously replenishes the solution carried by said belt.

3. Apparatus in accordance with claim 2, wherein said solution applying means comprises a reservoir for said solution, said loop passing through said reservoir.

4. Apparatus in accordance with claim 1, wherein said conveyor means comprises electrically conductive belt means including openings for supporting said components with the selected portions thereof projecting beneath said conductive belt means; means for maintaining said components in said supported position on said conductive belt means; means for moving said conductive belt means through said electroplating station in proximate relationship to said plating belt to effect said contact of said selected portions with said electroplating solution carried by said plating belt; and wherein said means for applying said potential includes a backing anodic electrode underlying said plating belt at said station and means for applying a potential to said conductive belt means to render said belt means and at least the portions of said component electrically continuous therewith, cathodic with respect to said backing anodic electrode.

5. Apparatus in accordance with claim 4, further including means for pumping electroplating solution from said reservoir and discharging said solution onto said plating belt at a point proximate to said plating station.

6. Apparatus in accordance with claim 5, wherein said conductive and plating belts substantially lie in planes during passage through said plating station.

7. Apparatus in accordance with claim 6, wherein said conductive belt means comprises a pair of parallel moving conductive belts, said openings for supporting said components being defined by the spacing between said belts.

8. Apparatus in accordance with claim 7, wherein said spacing between said belts is adjustable, to accommodate components of differing sizes.

9. Apparatus in accordance with claim 6, wherein said conductive belt means comprises a closed loop.

10. Apparatus in accordance with claim 6, wherein said means for maintaining said supported positions of said components, comprises an electrically non-conductive gripper belt means; means for applying said gripper belt means against a portion of said component opposite said conductive belt means; and means moving said gripper and conductive belt means through said electroplating station with said sandwiched portion of said component therebetween.

11. Apparatus in accordance with claim 10, wherein said conductive and gripper belt means each comprise closed loops in overlying relationship with respect to one another, said loops passing proximate to one another, and sandwiching said components at a flattened zone at said electroplating station.

12. Apparatus in accordance with claim 10, further including lead contact means overlying said conductor and gripper belt means at said electroplating station, and movable with said belts, for electrically engaging flexible leads extending from said components, whereby a cathodic potential with respect to said anodic electrode, may be applied to portions of said components projecting beneath said conductive belt means which are in contact with said leads but electrically insulated from the remainder of said components.

13. Apparatus in accordance with claim 12, wherein said lead contact means comprises a movable belt provided with a resilient conductive surface; means for applying said cathodic potential to said surface; and means moving said lead contact belt at a common velocity with said gripper and conductive belt means through said electroplating station.

14. Apparatus for continuous electroplating of selected portions of discrete electronic components while minimizing the plating of non-selected portions of said components, comprising:

a plating belt adapted for carrying electroplating solution;

means for applying electroplating solution to said belt;

belt means for forming said discrete components into an array of mutually spaced elements and bringing substantially only the said selected portions of said arrayed components into contact with said solution on said plating belt, and for providing relative movement between said belt and said arrayed components in a direction such that the path of movement of any said components does not substantially overlie an area on said belt previously depleted of solution by contact with another of said components; and means for applying a D.C. electrical potential between said component portions to be plated and said plating belt to enable said electroplating.

15. Apparatus in accordance with claim 14, wherein said means for providing movement between said belt and components, is adapted to advance said components as a line, the direction of movement of said aligned components being generally counter to the direction of movement of said belt, and said line making an angle with the line defining the direction of movement of said belt, which is less than 180°.

16. Apparatus in accordance with claim 15, wherein said means effecting said movement, include a conductive conveyor belt means including openings through which the said portions to be plated may project while said components are supported at the boundaries of said openings.

17. Apparatus in accordance with claim 16, further including conveying gripper belt means, adapted to move with aaid conductive conveying belt means, while maintaining said components firmly in contact with said conveyor belt means.

18. Apparatus in accordance with claim 17, further including a flexible electrically conductive surface, said surface being movable on a conveyor belt including a portion spaced from and parallel to said conductive conveyor means and gripper belt means; said flexible surface being adapted to contact electrical leads extending from said components and electrically contacting at least some of said portions to be plated; and further including, means for rendering said electrically conductive flexible surface at a potential common with said conductive conveying belt means.

19. A method for continuous electroplating of selected portions of discrete electronic components while minimizing the plating of non-selected portions of said components, comprising:

disposing electroplating solution upon a surface adapted for carrying said solution;

providing an electrical potential between points underlying said surface and the portions of said components to be electroplated;

arraying said discrete components as mutually spaced elements on a carrier belt and contacting substantially only the selected portions of said components to be electroplated with the solution on said surface, while providing relative sliding movement between said arrayed components and said surface;

the direction of movement of said arrayed components with respect to said surface being such that individual of said components do not contact in their course of progression, areas which are depleted of electroplating solution by virtue of previous contact with other of said components.

20. A method in accordance with claim 19, wherein said relative movement is provided by forming said surface upon a continuous closed loop, and advancing said loop continuously in lengthwise fashion, while continuously supplying electroplating solution to said surface at points spaced from the contact area with said components.

21. A method in accordance with claim 20, wherein said components are simultaneously moved as a continuous line across said surface, said line extending in a direction which is skewed with respect to a line parallel to the direction of movement of said loop.

22. A method in accordance with claim 21, wherein the direction of movement of said components makes an angle with respect to the line defining the direction of movement of said surface, of less than 180° and more than about 90°.

23. A method in accordance with claim 22, wherein said angle is between about 150° and 90°.

24. A method for continuous electroplating of selected portions of discrete electronic components of the type comprising an electrically conductive body terminating in a die-receiving face; a plurality of electrical contacts formed as insulated islands at said die-receiving face; with flexible wire leads being connected to at least some of said contacts and extending oppositely from said die-receiving face beyond the body of said components, but at least some of said leads being electrically insulated from said body and from one another; said selected portions to be electroplated being said die-receiving face, and at least some of said electrical contacts; and said method comprising:

continuously moving an applicator surface adapted for carrying electroplating solution through an electroplating station while applying electroplating solution to said applicator surface at a point in the progression thereof, upstream of said electroplating station;

conveying said discrete components as an array through said electroplating station and across said applicator surface with said die-receiving face and electrical contacts in sliding contact with said electroplating solution on said surface; the direction of movement of said conveyed array being such in relationship to the movement of said surface that the trace of each said component on said surface continuously overlies fresh electroplating solution; and applying a cathodic D.C. potential to both said die-receiving face and the said leads connected to the insulated contacts to be plated, and an anodic D.C. potential at the backside of said applicator surface, to enable said selective plating.

25. A method in accordance with claim 24, wherein said applicator surface is formed upon a continuous closed loop.

26. A method in accordance with claim 25, wherein said loop comprises an applicator belt.

27. A method in accordance with claim 24, wherein said discrete components are conveyed by an electrically conductive conveyor belt adapted for supporting said components, and said cathodic D.C. potential is applied to said die-receiving face by providing said cathodic potential to said conductive belt.

28. A method in accordance with claim 27, wherein said cathodic D.C. potential is applied to said flexible wire leads by a moveable lead contact belt overlying said electroplating station, and provided with a resilient conductive surface; said cathodic potential being applied to said resilient conductive surface; and said lead contact belt being moved through said electroplating station with said conductive surface in contact with said flexible leads.

* * * * *